United States Patent
Talarico et al.

(10) Patent No.: US 11,394,500 B2
(45) Date of Patent: Jul. 19, 2022

(54) CONTENTION WINDOW SIZE ADJUSTMENT FOR WIDEBAND OPERATION IN NEW RADIO—UNLICENSED

(71) Applicant: Intel Corporation, Santa Clara, CA (US)

(72) Inventors: Salvatore Talarico, Sunnyvale, CA (US); Gang Xiong, Portland, OR (US); Yingyang Li, Beijing (CN); Yongjun Kwak, Portland, OR (US); Carlos H. Aldana, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 16/828,766

(22) Filed: Mar. 24, 2020

(65) Prior Publication Data
US 2020/0244403 A1   Jul. 30, 2020

Related U.S. Application Data

(60) Provisional application No. 62/932,241, filed on Nov. 7, 2019, provisional application No. 62/907,226, filed
(Continued)

(51) Int. Cl.
*H04L 1/18* (2006.01)
*H04W 74/08* (2009.01)
(Continued)

(52) U.S. Cl.
CPC .............. *H04L 1/187* (2013.01); *H04L 1/008* (2013.01); *H04L 1/0067* (2013.01); *H04L 1/1692* (2013.01); *H04L 5/0007* (2013.01); *H04L 5/0044* (2013.01); *H04L 5/0055* (2013.01); *H04W 16/14* (2013.01); *H04W 74/0808* (2013.01)

(58) Field of Classification Search
CPC ..... H04L 1/008; H04L 1/0067; H04L 5/0044; H04L 1/1685; H04L 5/0007; H04L 1/1822; H04L 1/187; H04L 1/1861; H04L 1/1864; H04L 1/1692; H04L 5/0055; H04W 16/14; H04W 74/006; H04W 74/0808
See application file for complete search history.

(56) References Cited

U.S. PATENT DOCUMENTS

2014/0293899 A1* 10/2014 Ko .................. H04L 1/0026
                                                      370/329
2018/0254993 A1*  9/2018 Ahn ................... H04W 74/085
(Continued)

OTHER PUBLICATIONS

Lagen et al., "New Radio Beam-based Access to Unlicensed Spectrum: Design Challenges and Solutions," IEEE Commun. Surveys & Tutorials, 2019, arXiv:1809.10443v2 [cs.NI] Oct. 23, 2019, 30 pages.
(Continued)

*Primary Examiner* — Kevin C. Harper
*Assistant Examiner* — Henry Baron
(74) *Attorney, Agent, or Firm* — Schwabe, Williamson & Wyatt, P.C.

(57) ABSTRACT

Embodiments of the present disclosure describe methods and apparatuses for adjusting contention window size for new radio—unlicensed operation.

12 Claims, 11 Drawing Sheets

Related U.S. Application Data on Sep. 27, 2019, provisional application No. 62/905,612, filed on Sep. 25, 2019, provisional application No. 62/842,879, filed on May 3, 2019, provisional application No. 62/841,001, filed on Apr. 30, 2019.

(51) Int. Cl.
*H04W 16/14* (2009.01)
*H04L 1/00* (2006.01)
*H04L 1/16* (2006.01)
*H04L 5/00* (2006.01)

(56) References Cited

U.S. PATENT DOCUMENTS

2019/0159256 A1    5/2019  Talarico et al.
2019/0268883 A1*   8/2019  Zhang .................. H04W 16/14
2021/0051683 A1*   2/2021  Li ....................... H04L 41/0806

OTHER PUBLICATIONS

QUALCOMM Incorporated, "Revised SID on NR-based Access to Unlicensed Spectrum," 3GPP TSG RAN Meeting #77, RP-172021 (Revision of RP-171601), Agenda item: 9.3.3, Sapporo, Japan, Sep. 11-14, 2017, 5 pages.
3GPP, "Technical Specification Group Radio Access Network; Physical layer procedures for shared spectrum channel access (Release 15)," 3GPP TS 37.213 V15.2.0 (Mar. 2019), 5G, 20 pages.

\* cited by examiner

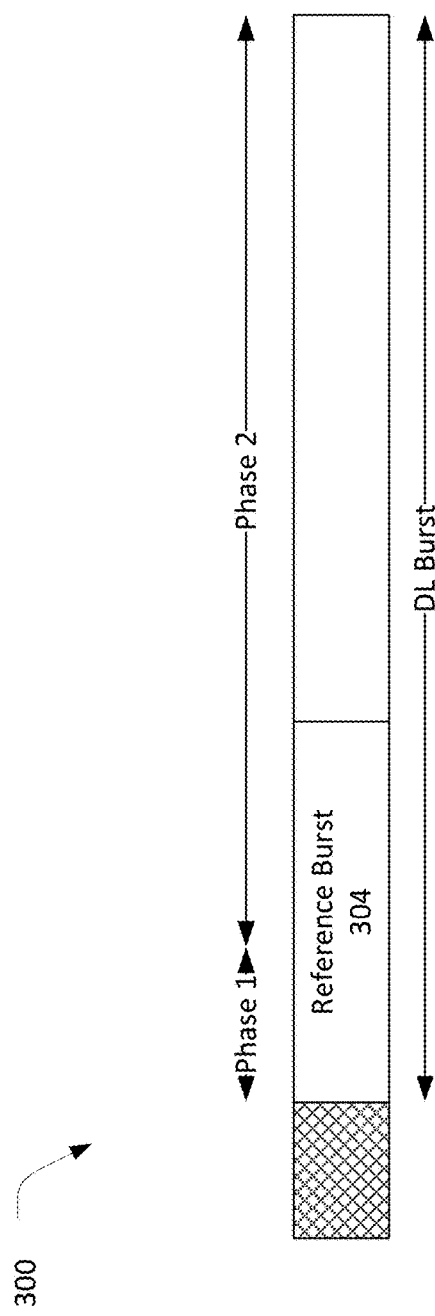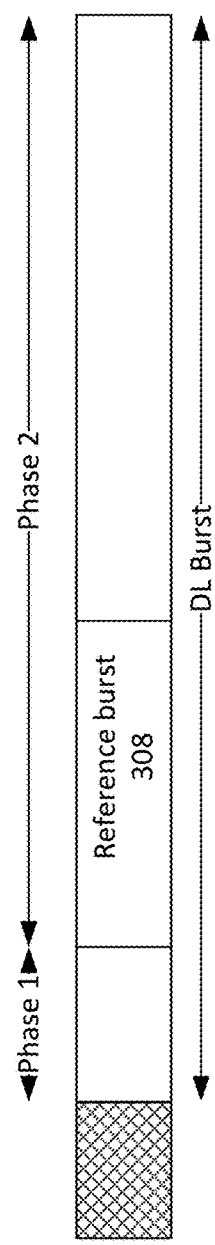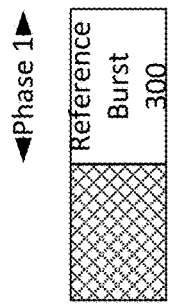

CONTENTION WINDOW SIZE ADJUSTMENT FOR WIDEBAND OPERATION IN NEW RADIO—UNLICENSED

RELATED APPLICATION

This application claims priority to U.S. Provisional Application Nos. 62/841,001 filed Apr. 30, 2019; 62/842,879 filed May 3, 2019; 62/905,612 filed Sep. 25, 2019; 62/907,226 filed Sep. 27, 2019; and 62/932,241 filed Nov. 7, 2019. The specifications of said applications are hereby incorporated by reference in their entireties.

FIELD

Embodiments of the present disclosure generally relate to the field of wireless communication, and more particularly, to apparatuses, systems, and methods for contention window size adjustment in wireless networks.

BACKGROUND

Each year, the number of mobile devices connected to wireless networks significantly increases. In order to keep up with the demand in mobile data traffic, changes have to be made to system requirements to be able to meet these demands Three critical areas that need to be enhanced in order to deliver this increase in traffic are larger bandwidth, lower latency, and higher data rates.

One of the major limiting factors in wireless innovation is the availability in spectrum. To mitigate this, the unlicensed spectrum has been an area of interest to expand the availability of cellular communications. In this context, one of the major enhancements for Long Term Evolution (LTE) in Third Generation Partnership Project (3GPP) Release 13 has been to enable its operation in the unlicensed spectrum via Licensed-Assisted Access (LAA), which expands the system bandwidth by utilizing the flexible carrier aggregation (CA) framework introduced by the LTE-Advanced (LTE-A) system In Release 13 LTE, multi-carrier operation was introduced for downlink (DL), and two alternative solutions were introduced to cope with multi-carrier listen before talk (LBT): type A and type B operation. In Type A operation, the eNB performs Cat-4 LBT on each carrier. Cat-4 LBT may be performed for data transmissions. In order to align the transmissions across carriers, the eNB performs a self-deferral. For this type of operation, the eNB may perform Type A1 or Type A2. In Type A1, the eNB may maintain a contention window size (CWS) counter and perform CWS adjustment independently for each carrier. In this case, if the eNB ceases transmission over one carrier, it may resume to decrease the counter for all other carriers if the channel is idle for 4 clear channel assessments (CCA) or after reinitializing the value of the counter. In Type A2, the eNB may maintain a common CWS counter and perform a common CWS adjustment for all the carriers. The CWS adjustment may be done by associating the highest CWS value across carriers to all carriers. In this case, if the eNB ceases transmission over one carrier, then the eNB may reinitialize the counter for all the carriers.

In Type B operation, the eNB selects a single carrier by either uniformly picking in a random fashion one carrier across all carriers or by configuring a specific carrier to operate as a so called "primary channel." A primary channel cannot be changed more than once every second. The eNB can perform sensing over the other carriers by applying a Cat-2 LBT only if the eNB completes the Cat-4 LBT for the primary channel. For this type of operation, the eNB may perform Type B1 or Type B2. In Type B1 operation, the eNB may maintain a CWS counter and perform CWS adjustment independently for each carrier. In this case the single carrier mechanism is used with the distinction that a CWS is increased if NACK is determined in all carriers within the reference subframe. In Type B2 operation, the eNB may maintain a common CWS counter and perform a common CWS adjustment for all the carrier.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 3A-3C illustrate three options for starting a reference burst in accordance with some embodiments.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrases "A or B," "A and/or B," and "A/B" mean (A), (B), or (A and B).

Figure 1:
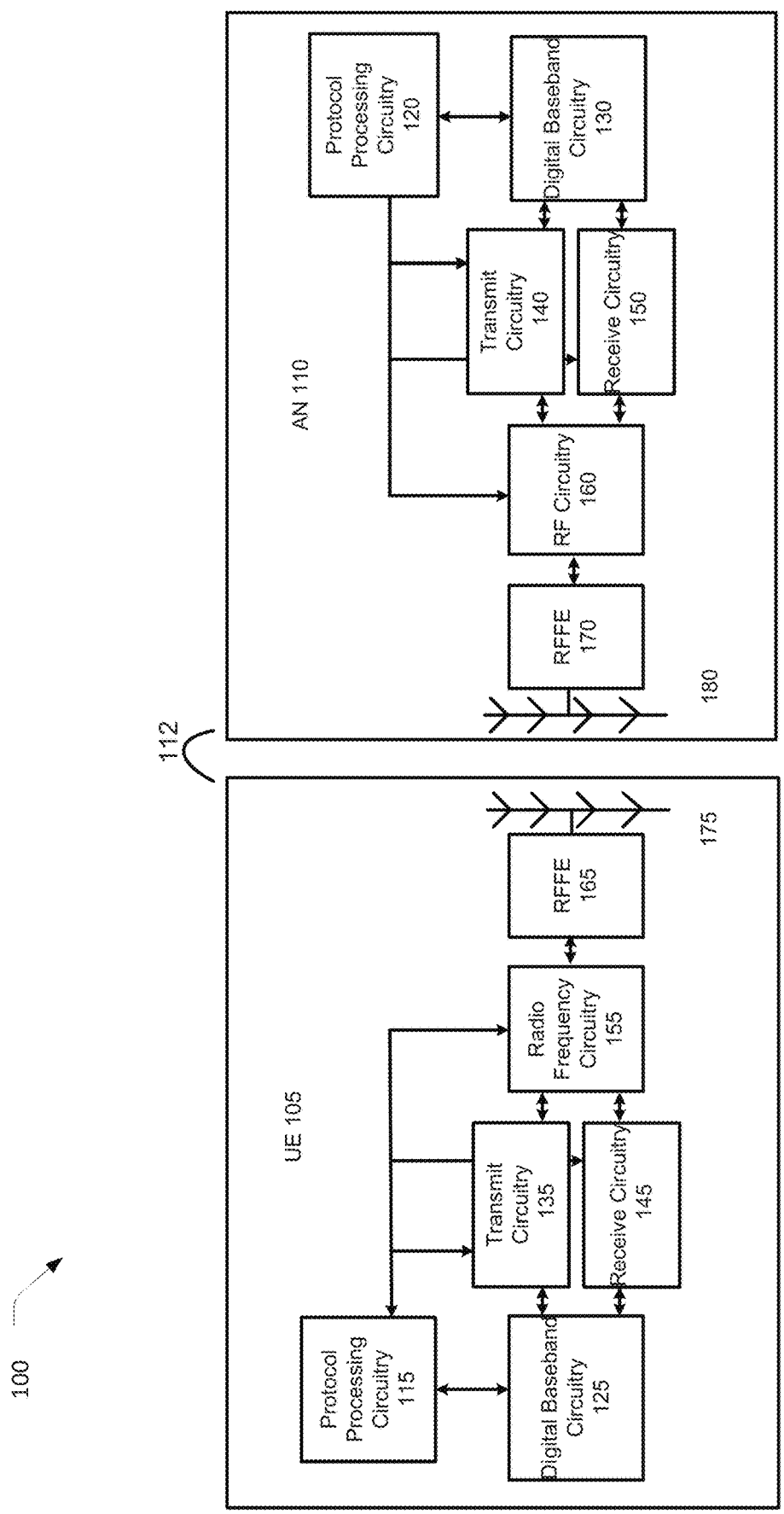
FIG. 1 illustrates a network in accordance with some embodiments.

FIG. 1 schematically illustrates an example wireless network 100 (hereinafter "network 100") in accordance with various embodiments herein. The network 100 may include a UE 105 in wireless communication with an access node (AN) 110. In some embodiments, the network 100 may be a 3GPP 5G/NR network. The UE 105 may be configured to connect, for example, to be communicatively coupled, with the AN 110 via connection 112. In this example, the connection 112 is illustrated as an air interface to enable communicative coupling, and can be consistent with cellular communications protocols such as an LTE protocol, a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 may be any mobile or non-mobile computing devices, such as a smartphone, personal data assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of hybrid automatic repeat request-acknowledgment (HARQ-ACK) functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system on chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175.

The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The transmission components of the UE 105 may apply a spatial filter to the data to be transmitted to form a transmit beam emitted by the antenna elements of the one or more antenna panels 180.

The UE 105 and the AN 110 may be configured to communicate with one another using NR access technologies within an unlicensed spectrum (NR-U). One of the challenges in this case is that this system must maintain fair coexistence with other incumbent technologies. In order to maintain a fair coexistence within a particular band, some restrictions may be taken into account. For instance, if operating in a 5 GHz band, a listen-before-talk (LBT) procedure may need to be performed in some parts of the world to acquire the medium before a transmission can occur.

For LBT, a device may first listen to the wireless medium to detect transmissions. If the medium is sensed to be busy, the device waits until the ongoing transmission is over. If the medium is detected to be idle for a period of time, for example, a distributed inter-frame space (DIFS) interval, the device enters a backoff procedure. In the backoff procedure, the device selects a random backoff time (in slots, for example) from a contention window (CW), and starts decrementing a backoff counter for each slot that is sensed to be idle. If, while counting down, another device begins transmitting, the device in backoff mode suspends its counting, until the transmitting device finishes and the medium is sensed to be idle for the DIFS interval, and resumes its countdown thereafter. Once the backoff interval expires, the device may begin transmission. The CW, from which the value of the random backoff interval may be chosen, lies between two preconfigured values, CW_min and CW_max. In some scenarios, the contention window is set to CW_min at the first transmission attempt, and increases (for example, doubles) after each unsuccessful transmission (e.g., after receiving a HARQ-NACK), until it reaches CW_max (after which it remains at CW_max). The contention window may be reset to CW_min after every successful transmission (e.g., after receiving a HARQ-ACK) or if a certain number of consecutive unsuccessful transmissions occur.

In some embodiments, except as otherwise described, the UE 105 or the AN 110 may perform a channel access procedure similar to that described in 3GPP Technical Specification (TS) 37.213 v15.2.0 (2019-03). Before sending a transmission, the transmitting device may first sense a channel to determine it is idle during slot durations of a defer duration T_d; and after a counter N is zero in step 4 below.

The counter N may be adjusted by sensing the channel for additional slot duration(s) according to the steps below:
1) set $N=N_{init}$, where $N_{init}$ is a random number uniformly distributed between 0 and $CW_p$, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

TS 37.213, section 4.1.1, page 6, where CW_p is a contention window for a channel access priority class p.

The value CWS, which corresponds to CW_p, used for a particular channel access priority class may be based on previous transmissions, e.g., PDSCH transmissions, associated with that channel access priority class. In particular, the AN 110 may track HARQ-ACK values for PDSCH transmissions with a reference subframe k and adjust the CWS accordingly. This will be described in further detail below in accordance with some embodiments.

In Release 15 NR, among other enhancements of the PHY layer, the HARQ procedure was improved and modified. To this end, the concept of code block groups (CBGs) were introduced to reduce overhead and increase spectral efficiencies when data packets with large transport block sizes (TBSs) are transmitted.

In essence, a transport block (TB) is divided into smaller subsets, called code blocks (CBs) that may be combined into CBGs. These groups are decoded by the UE, and the UE then sends HARQ feedback for each CBG, rather than for the TB. The access node may then retransmit the CBGs that were not received or decoded.

The aim for the CBG-based retransmission is to cope with the fact that NR supports very large TB Ss and as in legacy LTE the scheduler works with 10% BLER target. This implies that if the access node is transmitting data to the UE with a large TBS, around 10% of this data is subject to retransmission. However, if the TB is divided into smaller subsets, the UE will send NACK for only the failed subsets and the access node will only need to retransmit the failed subsets instead of the whole TB. This can effectively reduce the overhead of retransmission, and improve spectral efficiency. However, this may also increase the HARQ feedback overhead, since the UE will no longer need to transmit a single bit per TB, but it will need to send multiple bits for each TB based on the number of CBGs. In order to reduce this overhead, the CBG-based (re)transmission procedure may be configurable.

A UE may be semi-statically configured by RRC signaling to enable CBG-based retransmission. The max number of CBGs per TB can be configured by RRC to be, for example, {2,4,6,8}. By changing the number of CBGs per TB, the number of CBs per CBG also changes according to the TBS. In Release 15 NR, the CBG-based (re)transmission is allowed only for the TB of a HARQ process. The CBG-based (re)transmission procedure may also be separately configurable for UL and DL.

When operating the NR system on an unlicensed spectrum in wideband (for example, the bandwidth (BW) larger than 20 MHZ), before initiating any transmission, the LBT procedure should be performed in compliance with the regulatory requirements. The mechanism for the adjustment of the CWS used in LTE, briefly introduced above, should be adjusted accordingly to cope with both the operation over a wideband, as well as the possibility to enable either TB-based or CBG-based transmissions.

Embodiments of this disclosure describe how CWS adjustment may be performed for wideband operation in NR-U when either TB-based or CBG-based transmissions are enabled. This disclosure also describes how to update the CWS adjustment in standalone mode for physical random access channel (PRACH) and physical uplink control channel (PUCCH).

Some embodiments provide for CWS adjustment for wideband for downlink (DL) as follows.

Figure 2:
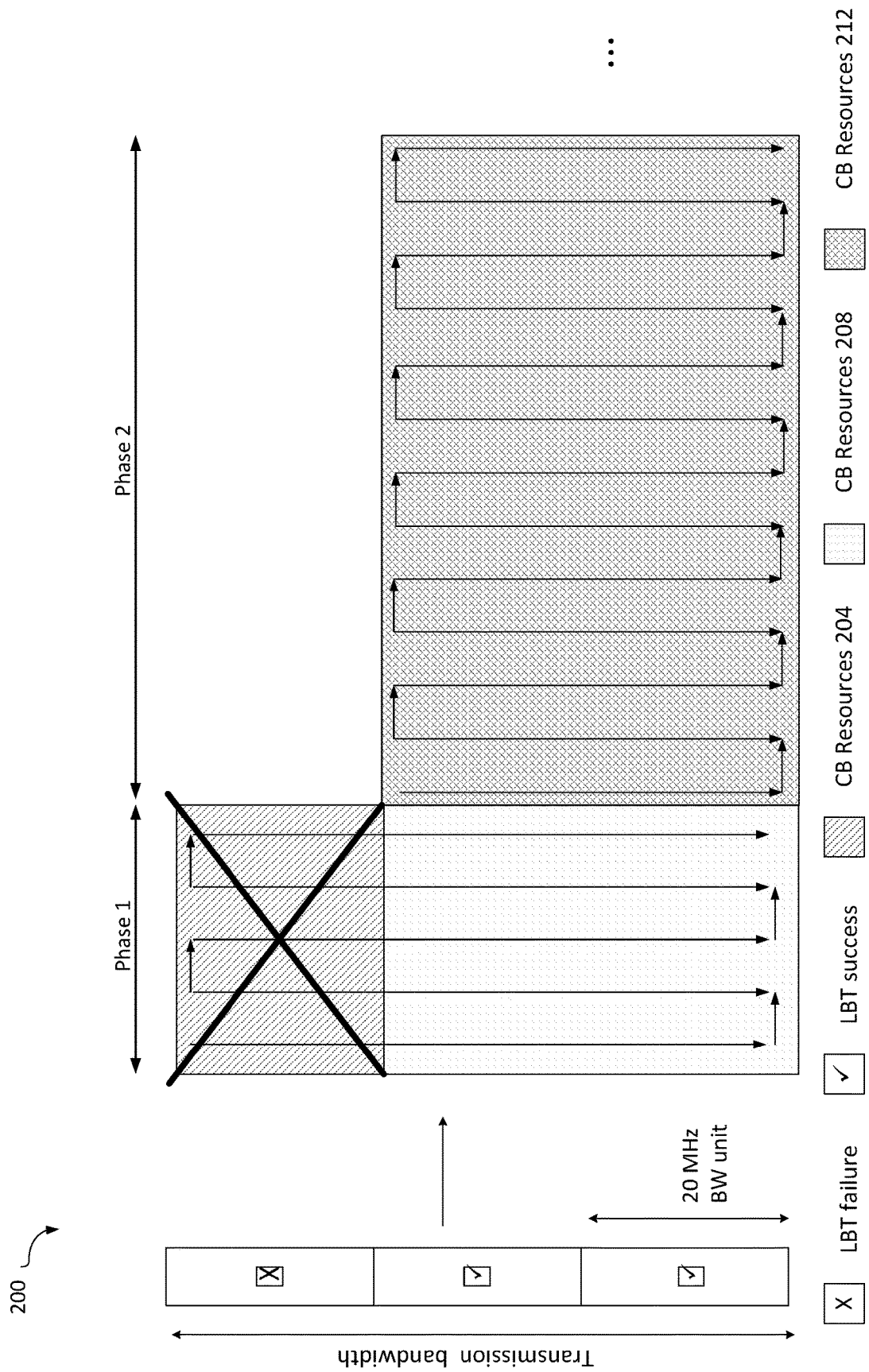
FIG. 2 illustrates operation of a device in accordance with some embodiments.

In NR-U, wideband operation is envisioned to be enabled for both standalone and carrier aggregation, as well as for both UL and DL. Furthermore, the device operation may be characterized by two different phases, phase 1 and phase 2. FIG. 2 illustrates operation of a device, for example, UE 105 or AN 110, in accordance with some embodiments.

Phase 1 may be the ramp-up phase, during which a device may perform LBT over each operating channel either in a sequential or a synchronous manner. In this case, the AN 110 would not prepare in advance the downlink transmissions from the AN side based on the possible outcomes of LBT, but puncturing may be applied to those carriers/channel for which LBT has failed. In other words, the transmission is prepared to be performed over the entire bandwidth and, if the LBT fails over some of the carriers/channels, rate matching cannot be applied.

Phase 2 may occur after a given time X, or after DCI 2_0, which contains information related to the bandwidth over which the LBT has succeeded, is transmitted. The transmitting device is able to rate match the initial transmission over the bandwidth over which LBT has succeeded.

In FIG. 2, the transmission bandwidth is shown as a 60 MHz bandwidth broken into three equally sized BW units. In phase 1, a device may perform an LBT procedure over the entire 60 MHz bandwidth in an attempt to perform a wideband transmission. Initially, CB resources 204 and 208 may be configured. However, the LBT procedure may fail with respect to the CB resources 204. Thus, the initiating device may not be able to use the CB resources 204 for transmission, but may use CB resources 208 and CB resources 212. As the initiating device may not have any knowledge of the LBT outcome until it is performed, the device may puncture its transmission within the units associated with the failed LBT, that is, CB resources 204.

In some embodiments, the initiating device may perform LBT using LBT priority classes, LBT parameters, and MCOT values, similar to those used described in TS 37.213, sections 4.1.1 and 4.2.1. However, the initiating device may use a CWS adjustment procedure that is modified to accommodate wideband operation and CBG-based retransmission procedures in accordance with some embodiments. Furthermore, some embodiments may utilize additional processes when NR-U operates in standalone mode to adjust the CWS based on PRACH and PUCCH transmissions, rather than PUSCH only transmissions.

In embodiments, the above division of phase 1 and phase 2 of FIG. 2 may be defined per cell. The duration of phase 1 may be predefined or configured by RRC signaling.

In embodiments, the above division of phase 1 and phase 2 of FIG. 2 may be defined per PDSCH per UE. For a PDSCH, if part of the scheduled physical resource blocks (PRBs) for the PDSCH is punctured due to failed a LBT, the PDSCH belongs to an operation of phase 1, otherwise it is phase 2.

As briefly mentioned above, a device may adjust a CWS based on a transmitted reference burst that follows an LBT procedure. FIG. 3 illustrates various options for defining a start of a reference burst used for CWS adjustment for wideband operation in accordance with some embodiments. The reference bursts of FIG. 3 are shown in the DL; however, other embodiments may employ similar concepts in the uplink.

The crosshatched section in the beginning of FIGS. 3A-3C depicts an LBT operation that may occur prior to data transmissions.

FIG. 3A illustrates a reference burst 304 in accordance with a first option. The reference burst 304 may be defined as starting from a beginning of Phase 1. The reference burst 304 can be confined within Phase 1 or it can be across the boundary between Phase 1 and Phase 2 as shown.

FIG. 3B illustrates a reference burst 308. The reference burst 308 is defined as starting from a beginning of Phase 2.

FIG. 3C illustrates a reference burst 312 in accordance with some embodiments. If there is no Phase 2, the reference burst 312 may be defined only for Phase 1.

The length of the reference burst may be defined in one or more of the following ways.

1. The reference burst may always be 1 ms long independently from the subcarrier spacing.

2. The reference burst may always be one slot or one partial slot, regardless of the subcarrier spacing. If the DL burst is composed of only a partial slot, then the reference burst may be defined as a partial slot. If a start of the DL burst includes a partial slot, then the reference burst may be composed by this partial slot+the subsequent slot.

3. The reference burst may be composed of the partial subframe (SF) or slot from the beginning of the DL burst for phase 1 or phase 2+following SF or slot independently from the subcarrier spacing. If the partial subframe/slot is the only subframe/slot included in the reference DL burst, only the partial subframe/slot is used for CWS adjustment.

4. The reference burst may be composed of N symbols (e.g., 14) from the start of the DL burst within phase 1 or phase 2. The value N may be configured by RRC signaling and may be larger than a number of symbols in the partial slot.

5. The reference burst may be composed of the partial slot only.

6. The reference burst may be composed of T ms, or µs, starting from the beginning of the DL burst within phase 1 or phase 2, where T, for example, is 1 ms.

The options listed above are not mutually exclusive. One or more of them may apply to the definition of a reference burst based on the premise that at least one PDSCH transmission may be contained within the reference burst.

In embodiments, regardless of the length of the reference burst, it may be defined so that at least some HARQ-ACK feedback for PDSCH is expected to be available.

In embodiments, the reference burst in wideband operation may start from the beginning of a DL burst after Cat-4 LBT is performed. For a PDSCH transmitted in the reference burst, if part of the scheduled PRBs for the PDSCH is punctured due to failed LBT, HARQ-ACK corresponding to the punctured PDSCH may not be used in the CWS adjustment. Thus, only HARQ feedback information corresponding to non-punctured PDSCH within the reference burst will be considered.

In embodiments, the reference burst in wideband operation may be defined to start X symbols/slots/subframes or milliseconds after Cat-4 LBT is performed (within Phase 1), or after DCI format 2_0, which may be used to notify a group of UEs of a slot format, is transmitted. In embodiments, if the AN 110 is able to perform a successful LBT over the whole band, then the value of X may be zero, and the reference burst may start soon after Cat-4 LBT is performed. In embodiments, regardless of the LBT success over each of the operating channels composing the wideband, the reference burst may be defined to start from X symbols/slots/subframes or ms after Cat-4 LBT. The value of X may be predetermined (for example, fixed in a Technical Specification) or may be configurable by, for example, RRC signaling.

In embodiments, depending on the length and starting position of the reference burst, the reference burst may contain only phase 1, both phase 1 and phase 2, or only phase 2.

In embodiments, if phase 1 is part of the reference burst, the HARQ-ACK related to the non-punctured and punctured PDSCH transmissions may be weighted differently for the purpose of CWS adjustment. A punctured PDSCH is much likely to fail in reception at UE side. The weighting could be larger for an ACK for a punctured PDSCH, while the weighting could be smaller for an NACK of a punctured PDSCH.

In one example, A and B are the weights applied to the ACKs and NACKs related to non-punctured PDSCHs, respectively, and C and D are the weights applied to the ACKs and NACKs related to punctured PDSCHs, respectively. In order to compute the ratio of the NACKs to the total HARQ-ACK values, a parameter Z is defined, which can be represented as follows:

$$Z=B*NACK(non\text{-}punctured)+D*NACK(punctured)/\\(A*ACK(non\text{-}punctured)+B*NACK(non\text{-}punctured)+C*ACK(punctured)+D*ACK(punctured).$$

In one example:
A=B=1, C=D where and 0<C<1.
A=B=1, C>=1, and 0<D<1.

In other embodiments, a device may set A=B=1 and C=D=0 when there is at least one non-punctured PDSCH(s). If there are no non-punctured PDSCH(s), the device may set A=B=0, C=D=1. In other words, if there is at least one non-punctured PDSCH(s) where HARQ feedback is expected to be available, Z1=NACK(non-punctured)/(ACK(non-punctured)+NACK(non-punctured)).

In embodiments, if at least one HARQ feedback is available for a non-punctured PDSCH which occurs in the reference burst, then a new Z may be defined such that $$Z=Z1=NACK(non\text{-}punctured)/(ACK(non\text{-}punctured)+NACK(non\text{-}punctured)).$$

If, within the reference burst there are only punctured PDSCH(s) where HARQ feedback is available, then $$Z=Z2=NACK(punctured)/(ACK(punctured)+NACK(punctured)).$$

If there is no HARQ feedback ready for the non-punctured, then the CWS may not be updated in some embodiments.

In embodiments, for Z=Z1 (e.g., at least one HARQ-ACK is available for a non-punctured PDSCH transmission within a reference burst), the threshold used within the CWS adjustment mechanism may be equal to 80%. In case Z=Z2 (e.g., the HARQ-ACK feedback is only available for punctured PDSCH(s) that occurred within a reference burst), then the threshold may be set to W % instead, where W can be as an example 90.

In other embodiments, a device may change the 80% threshold used to adjust the CWS when there are no non-punctured PDSCH(s). In other words, Z2 could have W % NACKs (instead of 80%) as the requirement to double CWS. If this happens, the threshold W can be adjusted to a value greater than or equal to 80. Three examples would be to set W=80, 90, or 100.

In embodiments, the HARQ-ACK feedback may be weighted based on the time and frequency domain occupancy for the purpose of CWS adjustment.

In embodiments, the HARQ-ACK feedback may be weighted based on the time occupancy for the purpose of CWS adjustment.

In embodiments, regardless of whether the reference burst starts from phase 1 or phase 2, the AN 110 may consider for the matter of CWS adjustment: only the first PDSCH transmission within a reference burst; only the first non-punctured PDSCH transmission within a reference burst; only the first punctured and non-punctured PDSCH transmission within a reference burst; all PDSCHs; all PDSCHs and in particular all NACKs for all PDSCHs which are punctured together with the non-punctured ones. The NACKs for punctured and non-punctured PDSCH may be weighted differently; all PDSCHs and in particular only all NACKs for all PDSCHs, which are non-punctured; the non-punctured PDSCHs only in case they result in an ACK, otherwise these will be neglected in the CWS adjustment mechanism.

In embodiments, the HARQ-ACK feedback information for a PDSCH transmission and retransmission may be counted differently for the purpose of CWS adjustment by applying a different weighting when counting the ACKs or NACKs that occurred within a reference burst of an LBT BW transmission (e.g., a subset of the BW units of the wideband) or wideband transmission. For a retransmitted PDSCH, punctured or not, it would be more likely to be successfully received due to soft combining reception at UE side. In this case, the weighting could be smaller for an ACK for a retransmitted PDSCH, while the weighting could be larger for a NACK of a retransmitted PDSCH.

In one example, A1 and A2 are the weights applied to the ACKs and NACKs related to non-punctured initial PDSCHs, respectively; B1 and B2 are the weights applied to the ACKs and NACKs related to non-punctured retransmitted PDSCHs, respectively; and C1 and C2 are the weights applied to the ACKs and NACKs related to punctured initial PDSCHs, respectively; and D1 and D2 are the weights applied to the ACKs and NACKs related to punctured retransmitted PDSCHs, respectively.

In one example:
A1=A2=B1=B2=1, C1>1, C2<<1, D1=1, D2<<1
A1=A2=1, B1<1, B2>1, C1>1, C2<<1, D1<1, D2<<1
A1=A2=1, B1=B2=1, C1=1, C2<<1, D1=1, D2<<1
A1=A2=1, B1<1, B2>1, C1>1, C2<<1, D1=1, D2<<1

In embodiments, a device may count HARQ-ACK feedbacks for punctured and non-punctured PDSCH transmissions occurring within a reference burst based on a puncturing root that caused the puncturing. Consider, for example, the puncturing roots described in the following three scenarios.

Scenario 1: puncturing occurs at a beginning of a wideband operation due to LBT failure in one of the LBT BWs over which CAT-4 is initially performed.

Scenario 2: puncturing occurs due to preemption of an enhanced mobile broadband (eMBB) packet due to a higher-priority transmission (e.g., an ultra-reliable low-latency (URLLC) packet).

Scenario 3: puncturing occurs due to overlapping resources between a scheduled resource block group (RBG) and a guard band in a wideband transmission.

In embodiments, independently of the puncturing root (e.g., Scenario 1, 2, 3), the punctured and non-punctured PDSCHs may be treated using the same criteria that corresponds to one of the options listed along this disclosure. In some embodiments, for Scenarios 1 and 2 from the list above, the feedback information from a punctured PDSCH may be treated differently from the non-punctured PDSCHs using one the options listed along this disclosure. As for Scenario 3, the feedback information for a punctured PDSCH is treated the same as a non-punctured PDSCH within the CWS adjustment mechanism.

In embodiments, the CWS adjustment for wideband operation is done per bandwidth part, for example, over the configured transmission bandwidth.

In embodiments, the CWS adjustment for wideband operation can be done per LBT sub-band (or LBT BW/BW unit), e.g., 20 MHz.

Figure 4A:
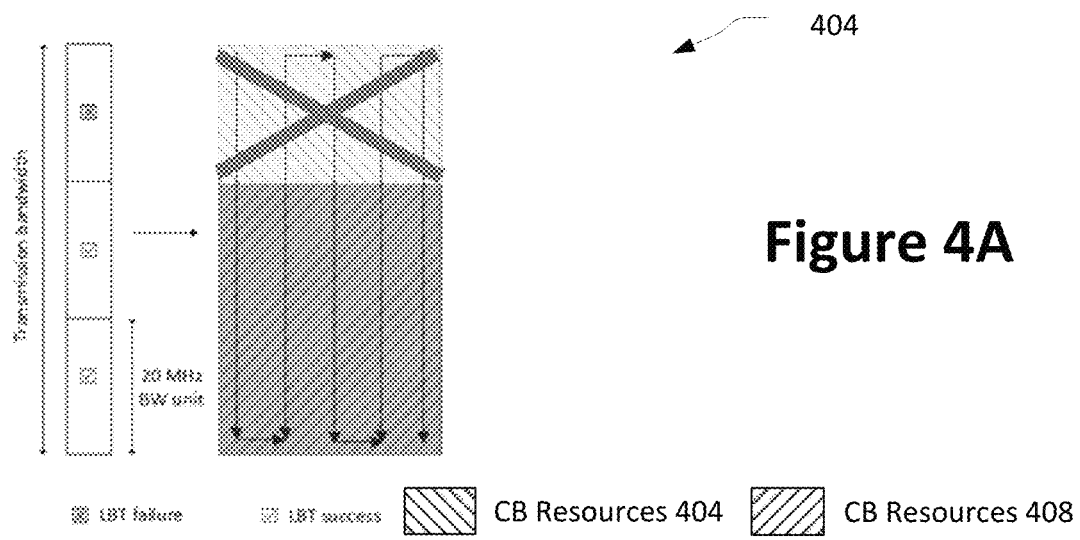
FIGS. 4A-4C illustrate three ways of mapping transport blocks or code-block groups to resources in accordance with some embodiments.
Figure 4B:
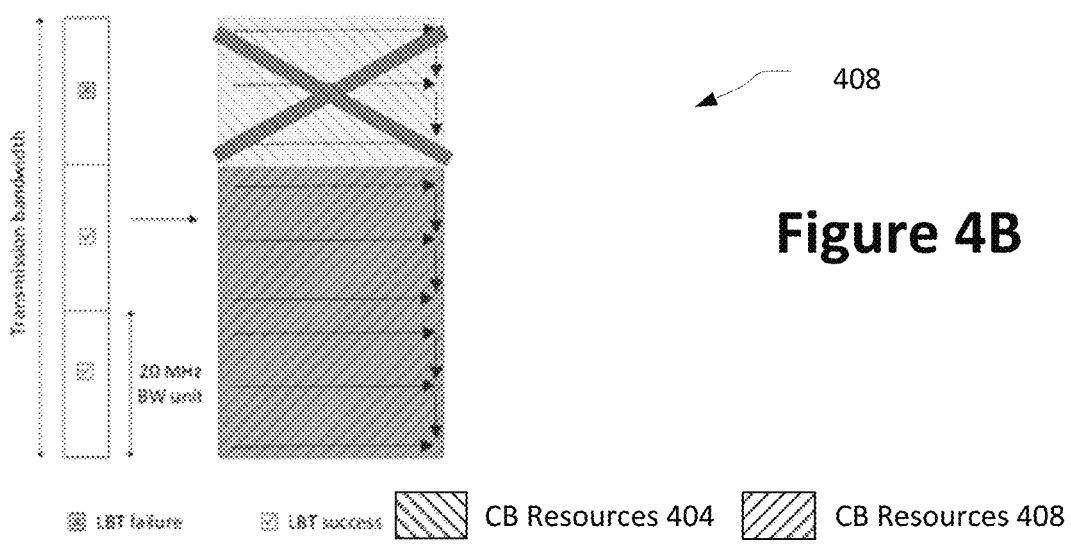
Figure 4C:
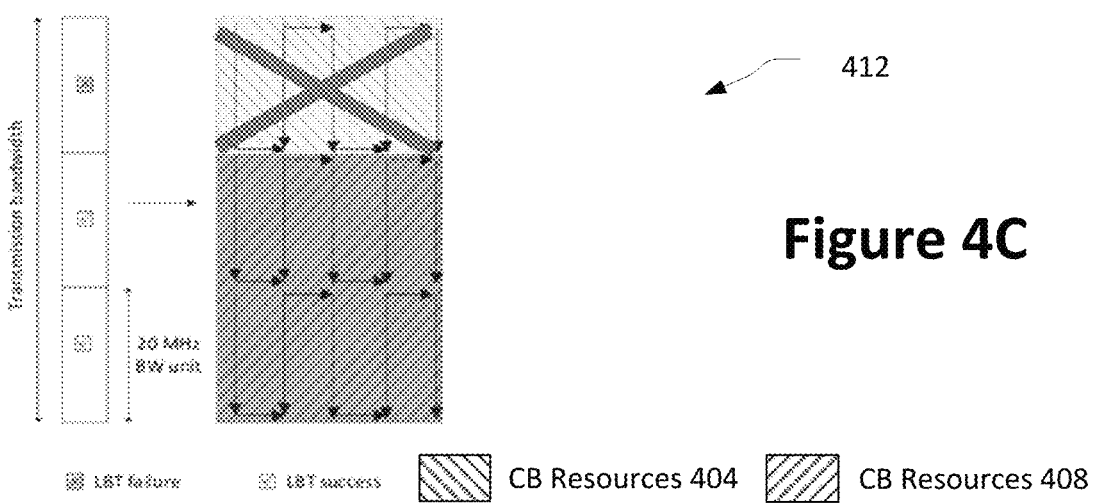

FIGS. 4A-4C illustrate various mappings that may be performed with respect to Phase 1 in accordance with some embodiments.

FIG. 4A illustrates a mapping 404 in which TB and/or CBG may be mapped using a mapping method similar to the Rel-15 NR method. For example, the mapping is performed first in frequency, then in time.

FIG. 4B illustrates a mapping 408 in which TB and/or CBG may be mapped using a mapping method similar to a LTE legacy method. For example, the mapping may be performed in time first, then frequency.

FIG. 4C illustrates a mapping 412 in which TB and/or CBG may be mapped using a mapping method similar to Rel-15 NR method for each carrier. For example, within individual carriers of the transmission bandwidth, the TB/CBGs may be mapped first in frequency then in time.

In embodiments, if the reference burst only contains phase 1 and/or only contains phase2, and mapping follows mapping 404, a device may use type A1, A2, B1, or B2 as described above. The CWS adjustment over a single channel or over all channels may follow the same rules used for narrowband for either CBG-based or TB based transmissions.

In embodiments, regardless of whether type A or type B is used, if the reference burst only contains phase 1 or only contains phase2, when TB-based transmission is performed, no changes may be needed within the adjustment mechanism compared to the LTE legacy mechanism.

In embodiments, regardless of whether type A or type B is used, and in case CBG-based transmission is enabled, if the reference burst only contains phase 1 or only contains phase 2, then the CWS may be increased to the next higher value: only if all the CBGs fail within a reference burst; only if at least one CGB has failed within the reference slot; or if X % of the CBGs have failed within the reference slot (for example, if percentage of NACKs corresponding to the CBGs is greater than a predetermined threshold X, which may be, for example, defined in a Technical Specification or signaled by RRC signaling).

In embodiments, if the reference burst only contains phase 1, and mapping 408 or 412 are used, the device may use A1, A2, B1, or B2 as described above. The CWS adjustment may be over a single channel or over all the channels and may follow the same rules used for narrowband for either CBG-based or TB-based transmissions.

In embodiments, regardless of whether type A or type B is used, if the reference burst only contains phase 1 when TB-based transmission is performed, no changes may be needed within the adjustment mechanism compared to the LTE legacy mechanism.

In embodiments, regardless of whether type A1 or B1 is used, and in case CBG-based transmission is enabled, if the reference burst only contains phase 1, the CWS may be increased to the next higher value: only if at least one CGB has failed within the reference slot per sub-band; only if all CGBs have failed within the reference slot per sub-band; or only if X % of the CGBs have failed within the reference slot per sub-band (for example, if percentage of NACKs corresponding to the CBGs is greater than a predetermined threshold X, which may be, for example, defined in a Technical Specification or signaled by RRC signaling).

In embodiments, regardless of whether type A2 or B2 is used, and in case CBG-based transmission is enabled, if the reference burst only contains phase 1 then the CWS may be increased to the next higher value: only if at least one CBG has failed within the reference slot over the whole sub-bands; only if all CGBs have failed within the reference slot over the whole subbands; or only if X % of the CGBs have failed within the reference slot over the whole sub-bands (for example, if percentage of NACKs corresponding to the CBGs is greater than a predetermined threshold X, which may be, for example, defined in a Technical Specification or signaled by RRC signaling).

Notice that the above embodiments may be extended to UL. In embodiments, for wideband operation in UL, only Type A may be used.

Embodiments describing CWS adjustment for standalone mode are described as follows.

In embodiments, a back-off counter is maintained by the UE for each channel (e.g. physical uplink control channel (PUCCH), physical random access channel (PRACH), and physical uplink shared channel (PUSCH)) separately. In embodiments, a single back-off counter is maintained for all the channels (e.g., PUCCH, PRACH, and PUSCH) in UL.

In embodiments, if multiple channel transmissions follow within the same reference burst, then CWS adjustment is done sequentially, or only done once for the first or last channel transmission within the reference burst. In embodiments, if multiple channel transmissions follow within a reference burst, and each with a different CAT-4 priority class, only the Cat-4 LBT with the highest priority class value is updated. In embodiments, if multiple channel transmissions follow within a reference burst, and each with a different CAT-4 priority class, only the Cat-4 LBT with the lowest or the highest priority class value is updated.

CWS Adjustment Procedure for PRACH is described in more detail as follows.

Figure 5:
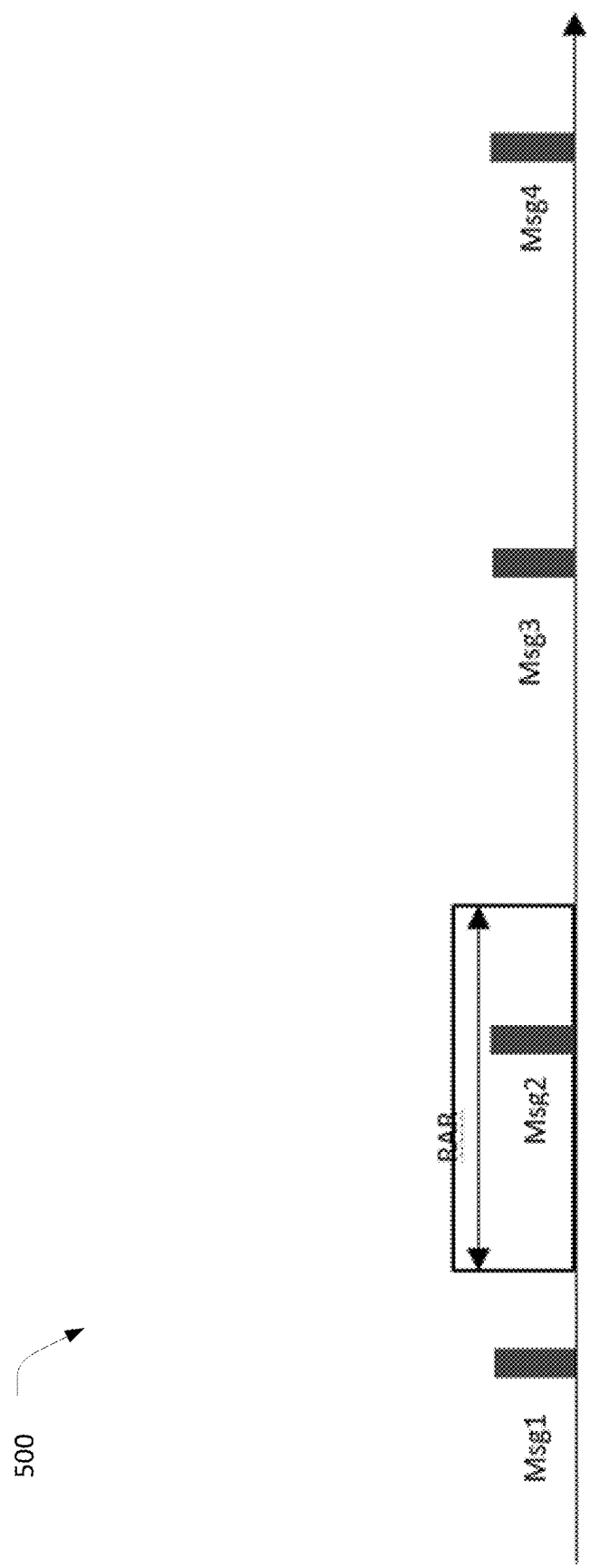
FIG. 5 illustrates a random access channel procedure in accordance with some embodiments.

FIG. 5 illustrates a RACH procedure 500 for NR-U in accordance with some embodiments. The RACH procedure 500 illustrates four messages of the 4-step RACH procedure. However, other embodiments may apply equally well to 2-step RACH, with changes noted below.

In some embodiments, no additional procedure is introduced for CWS adjustment for PRACH. Here the CWS can be chosen to be always the minimum value. Or CWS can be always chosen to be the max value.

In some embodiments, CWS may adjusted as follows.

A device transmits msg2 for 4-step RACH or msg B for 2-step RACH within a reference burst. If these messages are not received within an anticipated reception window or there is no detection of PDCCH masked with RA-RNTI within the anticipated reception window, the CWS may be increased to a next higher value up to a maximum value.

If msg4 for 4-step RACH, referring to the msg3 transmitted within the reference burst, is not received within the anticipated reception window, and/or NACK is received regarding msg3, then the CWS may be increased to the next higher value up to the maximum value.

Otherwise, CWS may be reset.

In embodiments, the above procedure may be performed independently of the reference burst.

In some embodiments, the CWS adjustment may be performed as follows.

No CWS update may be done based on the reception of msg2 for the 4-step RACH.

If msg4 for 4-step RACH, referring to the msg 3 that was transmitted within the reference burst, or msg B for 2-step RACH referring to the msgA that was transmitted within the reference burst, is not received within the anticipated reception window, and/or NACK is received regarding msg 3/B, then the CWS may be increased to the next higher value up to the maximum value. Otherwise, CWS may be reset.

In embodiments, the above procedure may be performed independently of the reference burst.

In embodiments, regardless of the method used to update the CWS, if msg 1, msg A, and/or msg3 is not transmitted, the CWS may be increased to the next higher value up to the maximum value.

In embodiments, regardless of the method used to update the CWS, if msg 1, msg A, and/or msg3 is not transmitted the CWS may remain unchanged.

In embodiments, the CWS adjustment may need to cope with the issue related to the fact that multiple UEs might potentially chose the same PRACH preamble, and by receiving msg2 it may not be possible for the UE to determine whether this is due to the successful reception of the PRACH preamble, or whether the transmitted preamble was not received and the Msg2 is intended for another UE that has picked the same preamble. In this matter, if CWS was updated after the reception of msg2, and the CWS was reset, the CWS value before this update may be reinstated if msg4 is not received, and CWS may be increased to the next higher value. In embodiments, this last step may always be applied, or it may be applied only if the msg3 related to the msg4 is transmitted in a reference burst.

CWS Adjustment procedure for PUCCH may be as follows.

In some embodiments, no additional procedure is introduced for CWS adjustment for PUCCH, and the same CWS value used for the prior transmission containing data is used. If this is not available CWS, can be chosen to be the minimum value. Alternatively, the CWS can be always to be the maximum value.

In embodiments, if PUCCH carries HARQ then the CWS adjustment can be based upon a new data indicator (NDI) toggling with the DL assignment corresponding to the reference burst. Thus, the adjustment of the CWS for the LBT at the UE performed for a PUCCH transmission can be adjusted based on the NDI information received. In this case, if the NDI is toggled, then the CWS may be reset; otherwise the CWS may be increased to the next higher value.

In embodiments, the CWS update may only be performed if the PUCCH triggering and PUCCH transmission are on the same carrier, and no update is done when these are transmitted on a different carrier.

In embodiments, if PUCCH does not carry HARQ-ACK but carries channel state information (CSI) only, scheduling request (SR) only, or both CSI and SR, then NDI may not be transmitted, and CWS adjustment may not be performed. In embodiments, a new signaling procedure may be introduced to allow the UE to receive a feedback regarding the reception of CSI and/or SR, and this signal is used similarly as NDI for the case HARQ-ACK is transmitted to update the CWS adjustment.

The CWS adjustment of PUCCH could be incorporated with the HARQ-ACK transmissions with dynamic or semi-static HARQ-ACK codebook.

To support dynamic HARQ-ACK retransmission, a set index can be assigned to a set of PDSCHs. HARQ-ACK may then be determined for the set of PDSCHs with same set index. The set of PDSCHs include all PDSCHs with the same set index whose HARQ-ACKs are not successfully transmitted yet. There could be multiple sets of PDSCHs with different set indexes, e.g., a 2-bit set index can support up to 4 set of PDSCHs. The size of the set indexes can be configured by RRC (either by UE-specific manner or by cell-specific manner) or fixed in the specification. A set of PDSCHs may include multiple subsets of PDSCHs.

For a subset of PDSCHs, there can be 3 different conditions: 1st condition where corresponding PUCCH resource is being allocated for the first time; 2nd condition where corresponding PUCCH resource is never assigned yet; 3rd condition where corresponding PUCCH resource is already assigned in an earlier time but corresponding HARQ-ACK transmissions were not completed due to LBT failure and/or gNB detection error.

When a PDSCH is scheduled by a DCI, the DCI may include all or part of the following information: one indication for a set of PDSCHs, e.g., a set index, HARQ-ACK for all PDSCHs scheduled by DCI with same set index could be reported using the PUCCH resource indicated in the same DCI; one indication to reset a set of PDSCHs, the reset indicator can operate in a toggle or not toggle manner like NDI field. Once reset indicator is toggled, HARQ-ACKs for PDSCHs with different reset indicator value are omitted in HARQ-ACK transmission; counter—downlink assignment index (C-DAI), which may be incremented across all DCIs with same set index if reset indicator is not toggled. The first DCI with toggled reset indicator will have C-DAI equal to 1; total—downlink assignment index (T-DAI), which may indicate a total number of DCIs till now across all DCIs with same set index with reset indication not toggled.

To form a HARQ-ACK codebook to be reported on a PUCCH resource for a set of PDSCHs, the UE may compare the reset indicator of a PDSCH in the set with the reset indicator in the DCI indicating the PUCCH resource. That is, HARQ-ACK for all PDSCHs with the same reset indicator may be included in the codebook. C-DAI/T-DAI may help to order the HARQ-ACK bits and decide on a correct codebook size. The exact codebook may be dynamically changed depending on the AN's scheduling.

To support semi-static HARQ-ACK retransmission, a HARQ-ACK codebook could include the HARQ-ACK for a set of the configured HARQ processes. The DCI could include one bit information, e.g., reset indicator, which controls HARQ-ACK feedback for a set of HARQ processes. Reset indicator could operate in a toggled/not toggled manner. Reset indicator could indicate whether the UE needs to report HARQ-ACK in the current PUCCH for a latest PDSCH of a HARQ process whose HARQ-ACK is expected to be transmitted in a previous PUCCH for the first instance of HARQ-ACK feedback. Alternatively, the reset indicator could indicate if a previous PUCCH carrying HARQ-ACK is correctly received by the gNB. The scheme can operate on all HARQ processes as a whole, or can operate on each subset of HARQ processes separately. Preferably, if a PUCCH is correctly received, the AN can trigger new HARQ-ACK transmission with the reset indicator toggled; if PUCCH is incorrectly received or not detected, the AN may trigger HARQ-ACK retransmission with reset indicator not toggled.

According to the above scheme for dynamic or semi-static HARQ-ACK transmission, the reset indictor in a DL assignment could be an indicator whether a previous PUCCH transmission is correctly received by gNB or not. Therefore, the reset indicator could be used as a reference for CWS adjustment of PUCCH. In this case, if the reset indictor is toggled, then CWS is reset, otherwise the CWS is increased to the next higher value up to the maximum value.

CWS adjustment handling with multiple transmissions may be described as follows in accordance with some embodiments.

In NR-U configured grant (CG) operation, multiple contiguous CG PUSCH transmissions are allowed, where the multiple transmissions may actually be repetitions. Embodiments describe how to handle this case for the purpose of adjusting the CWS independently on whether the transmissions are over 20 MHz channel bandwidth or over a wider bandwidth. Consider a minimum HARQ timeline D that is defined as the minimum time (or number of orthogonal frequency division multiplexing (OFDM) symbols) needed between the end of a PUSCH transmission until the gNB can provide a feedback information. Given the minimum HARQ timeline D, a downlink feedback information (DFI) DCI (which contains HARQ-ACK feedback related to CG PUSCH transmissions) may be transmitted earlier than the time the gNB may potentially need to process all the PUSCH repetitions within a burst and provide a feedback after the completion of the soft combining. In this case, an earlier feedback may be transmitted, which may not be representative of the channel contention.

Figure 6:
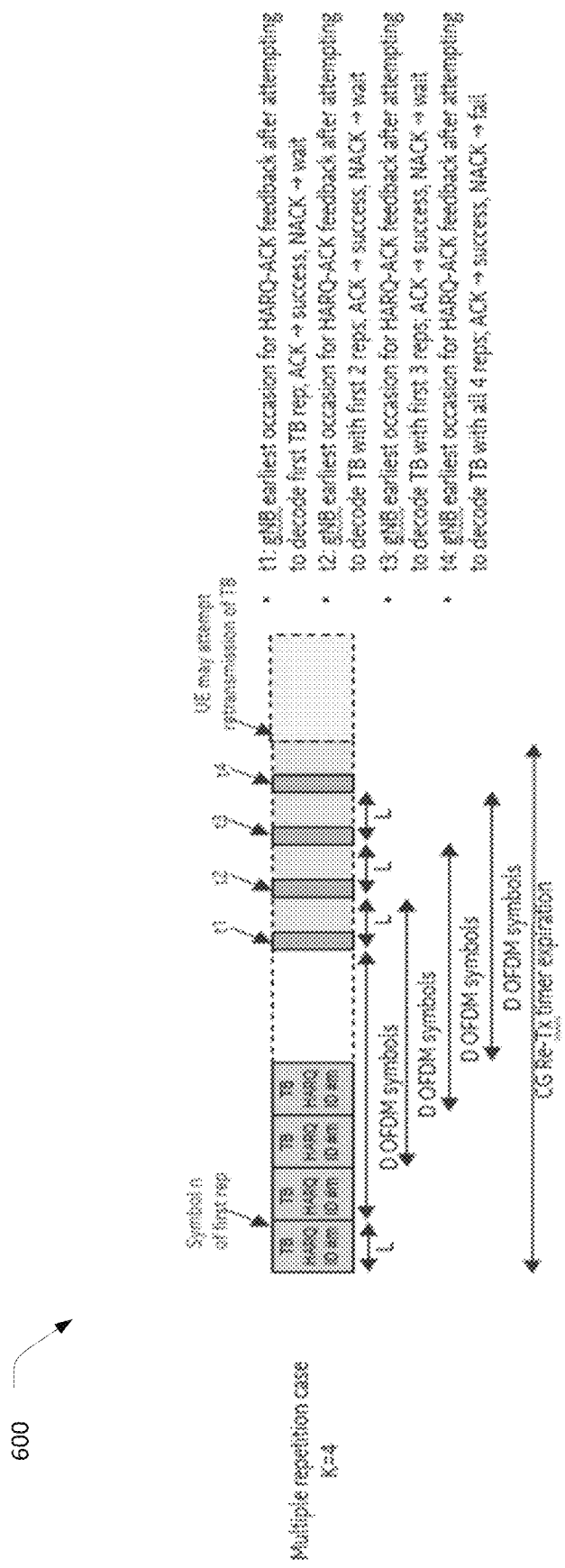
FIG. 6 illustrates a transmission in accordance with some embodiments.

FIG. 6 illustrates a transmission 600 in accordance with some embodiments. The transmission 600 may include a TB associated with HARQ ID #m transmitted four times, K=4. The earliest occasion for a HARQ-ACK feedback after attempting to decode a TB will be D OFDM symbols after the particular TB is transmitted. If the TB is successfully received, the gNB may transmit an ACK. If not, and the transmission is not the last one, the gNB will wait for a subsequent repetition. If the TB is not successfully received after the fourth transmission, the gNB may send a NACK.

Various embodiments provide a variety of options in which a NACK received in the context of repetitive transmissions. For example, a NACK may always be counted in the CWS adjustment regardless of the timing at which it is received relative to the last symbol of the last PUSCH repetition. In another example, a NACK may be counted only when it occurs after the earliest occasion for which the HARQ-ACK feedback is available after attempting to decode a TB with all repetitions. With respect to FIG. 6, this coincides with t4. In another example, if an ACK is received it is counted in the CWS adjustment mechanism regardless of the timeline at which it is received relative to the last symbol of the last PUSCH repetition. In another example, an ACK may be applied in the CWS adjustment only when it occurs after the earliest occasion for which the HARQ-ACK feedback is available after attempting to decode a TB with all repetitions.

In some embodiments, the CWS adjustment for CG mode may be performed as follows.

Release 15 describes CWS adjustment mechanisms to cope with operation of autonomous uplink (AUL) as follows.

If the UE receives a UL grant or an AUL-DFI, the contention window size for all the priority classes may be adjusted as following:
  If the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{ref}+3$ indicates ACK.
  For every priority class $p \in \{1,2,3,4\}$ set $CW_p=CW_{min,p}$
  Otherwise, increase $CW_p$ for every priority class $p \in \{1,2,3,4\}$ to the next higher allowed value.

3GPP TS 37.213, Section 4.2.2, page 16.

For AUL, since a new transmission and a retransmission can be discerned from whether the NDI is toggled or not, when an UL grant is received granting a transmission with an HARQ process ID that is used by the UE for AUL, the UE can utilize this information to establish whether the previous transmission was successfully received or not, and based on this information being able to update accordingly its CWS.

In NR-U, the CG design might be used in handling and discerning a new transmission and a retransmission according to which a transmission and retransmission are discerned through the radio network temporary identity (RNTI) scrambled with the UL grant (cell-RNTI (C-RNTI) for a new transmission, and configured scheduling-RNTI (CS-RNTI) for a retransmission). If this is the case, the CWS adjustment mechanism may be modified accordingly.

In one embodiment, if the UE receives at least an UL grant scrambled with C-RNTI scheduling an UL transmission with an HARQ process ID associated with the HARQ process ID of UL-SCH which follows within the reference burst, then for every priority class the CWS is reset by setting it to its minimum value regardless of the NDI value.

Figure 7:
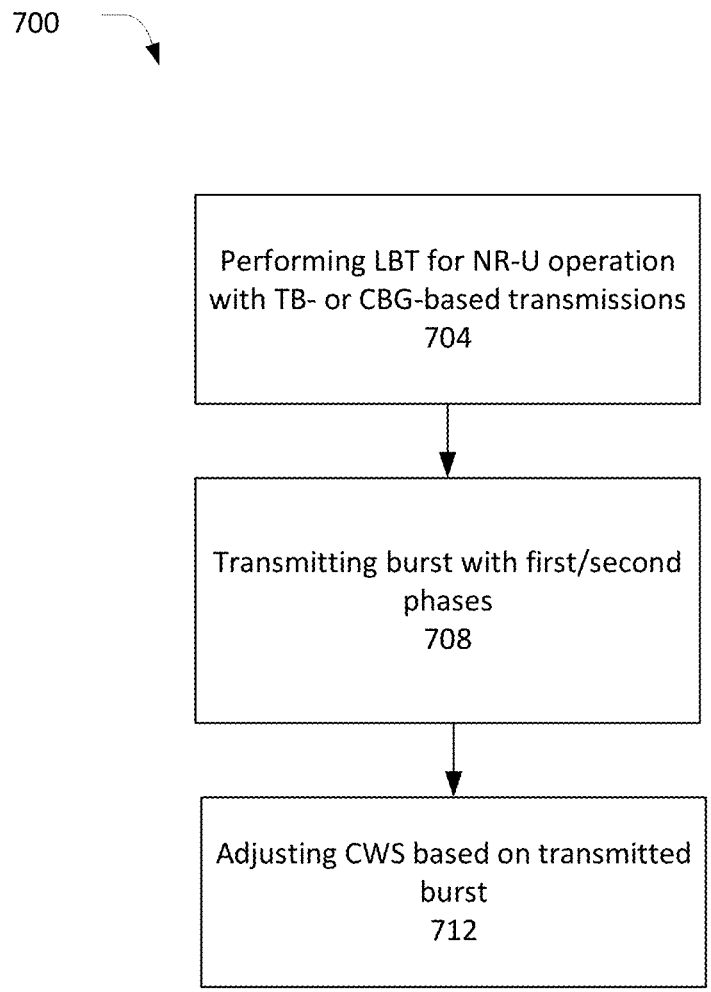
FIG. 7 illustrates an example operation flow/algorithmic structure in accordance with some embodiments.

In one embodiment, the CWS adjustment may be performed as follows:
If the UE receives an UL grant or a CG-DFI, the contention window size for all the priority classes is adjusted as following:
  If the NDI value for at least one HARQ process associated with HARQ_ID_ref is toggled, or if the HARQ-ACK value(s) for at least one of the HARQ processes associated with HARQ_ID_ref received in the earliest CG-DFI after at least a minimum duration D indicates ACK.
  For every priority class $p \in \{1,2,3,4\}$ set $CW_p=CW_{min,p}$
  Otherwise, increase $CW_p$ for every priority class $p \in \{1,2,3,4\}$ to the next higher allowed value;

FIG. 7 illustrates an operation flow/algorithmic structure 700 in accordance with some embodiments. The operation flow/algorithmic structure 700 may be performed by the UE 105 or AN 110 or components thereof. For example, the operation flow/algorithmic structure 700 may be performed by digital baseband circuitry of the UE 105 or the AN 110 described above with respect to FIG. 1.

The operation flow/algorithmic structure 700 may include, at 704, performing an LBT procedure for an NR-U operation with TB-based transmissions or CBG-based transmissions. The LBT procedures may be based on a CWS stored in memory of the device. The LBT procedure may be performed over a plurality of BW units of a wideband transmission bandwidth. In some embodiments, the BW units may be 20 MHz units; however, they may be other sizes in other embodiments. Additionally, the BW units may be the same size or different sizes.

The operation flow/algorithmic structure 700 may further include, at 708, transmitting a burst with first and second phases. During phase 1, the burst may be transmitted with the assumption that the entire transmission bandwidth is available. If the entire transmission bandwidth is not available, for example, the LBT procedure was not successful in one or more BW units, those BW units may be punctured. During phase 2, the burst may be only transmitted in the BW units in which the LBT procedure was successful. Thus, the burst may not be rate matched in the first phase, and may be rate matched in the second phase.

In various embodiments, the burst may be an uplink or downlink burst. It may include one or more channels, for example, PDSCH, PUSCH, PUCCH, or PRACH. In some embodiments, the burst may include a plurality of repetitions of the same transmission.

The operation flow/algorithmic structure 700 may further include, at 712, adjusting the CWS based on the transmitted burst. In some embodiments, the adjustment may be based on whether a portion of the burst, which may be referred to as the reference burst, was properly received by the receiving device. This may be based on HARQ that corresponds to the reference burst or other information that may be indicative of the likely successful receipt of the reference burst.

Figure 8:
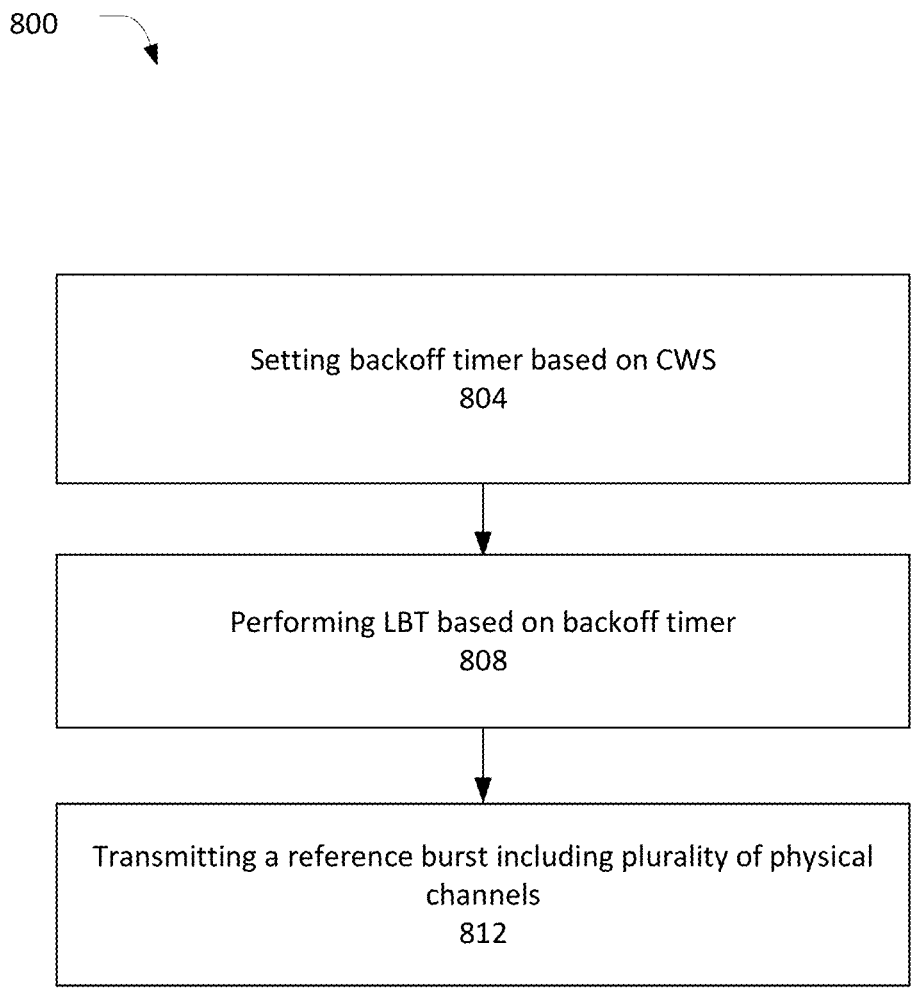
FIG. 8 illustrates an example operation flow/algorithmic structure in accordance with some embodiments.

FIG. 8 illustrates an operation flow/algorithmic structure 800 in accordance with some embodiments. The operation flow/algorithmic structure 800 may be performed by the UE 105 or the AN 110 or components thereof. For example, the operation flow/algorithmic structure 800 may be performed by digital baseband circuitry of the UE 105 or AN 110 described above with respect to FIG. 1.

The operation flow/algorithmic structure 800 may include, at 804, setting a backoff timer based on a CWS. The CWS may be stored in a memory of the device and it may be a CWS minimum value, a CWS maximum value, or any value in between.

The operation flow/algorithmic structure 800 may further include, at 808, performing an LBT procedure based on the backoff timer. The LBT procedure may be performed over a wideband transmission bandwidth as described above.

The operation flow/algorithmic structure 800 may further include, at 812, transmitting a reference burst including a plurality of physical channels or repeated transmissions. The physical channels may include, for example, PDSCH, PUSCH, PUCCH, or PRACH transmissions. In some embodiments, the reference burst may include a plurality of repetitions of the same transmission.

Figure 9:
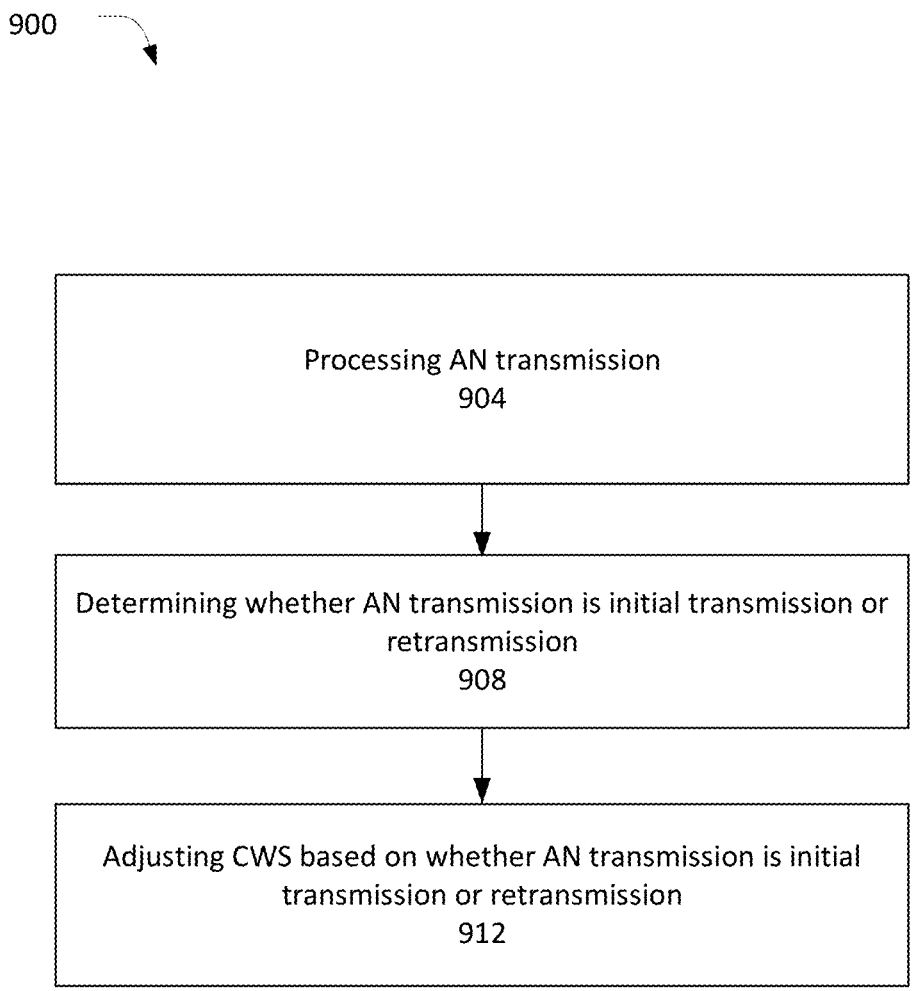
FIG. 9 illustrates an example operation flow/algorithmic structure in accordance with some embodiments.

FIG. 9 illustrates an operation flow/algorithmic structure 900 in accordance with some embodiments. The operation flow/algorithmic structure 900 may be performed by the UE 105 or AN 110 or components thereof. For example, the operation flow/algorithmic structure 900 may be performed by digital baseband circuitry of the UE 105 or AN 110 described above with respect to FIG. 1.

The operation flow/algorithmic structure 900 may include, at 904, processing a transmission. The transmission may be a transmission from the AN, for example, an AN transmission, or it may be a transmission from the UE, for example, a UE transmission. In various embodiments, the transmission may be transmitted or it may be received by the device performing the operation flow/algorithmic structure 900.

The operation flow/algorithmic structure 900 may further include, at 908, determining whether the transmission is an initial transmission or a retransmission.

The operation flow/algorithmic structure 900 may further include, at 912, adjusting a CWS based on determination of whether the AN transmission is an initial transmission or a retransmission. As described herein, different weights may be afforded to initial transmissions as opposed to retransmissions for purposes of adjusting the CWS.

In some embodiments, the CWS may be based on information that indicates whether the transmission was properly received by a receiving device (for example, HARQ information).

In some embodiments, the transmission is an AN transmission and includes an uplink grant or a CG-DFI. In those embodiments, the device may determine whether the transmission is scrambled with a C-RNTI or a CS-RNTI; and determine, based on whether the transmission is scrambled with C-RNTI or CS-RNTI, whether the transmission corresponds to an initial transmission or a retransmission.

If the transmission is an uplink grant, scrambled with C-RNTI, that schedules the initial transmission with a HARQ process ID that is associated with a HARQ process ID of an UL-SCH that follows within a reference burst, the device may reset the CWS, for every priority class, to its minimum value.

In some embodiments, the transmission is an uplink grant and the device will determine whether the uplink grant includes a NDI that is toggled. If it is toggled, it may indicate the uplink grant corresponds to an initial transmission. In this case, the device may reset the CWS, for every priority class, to its minimum value. Otherwise, the CWS may be increased.

Figure 10:
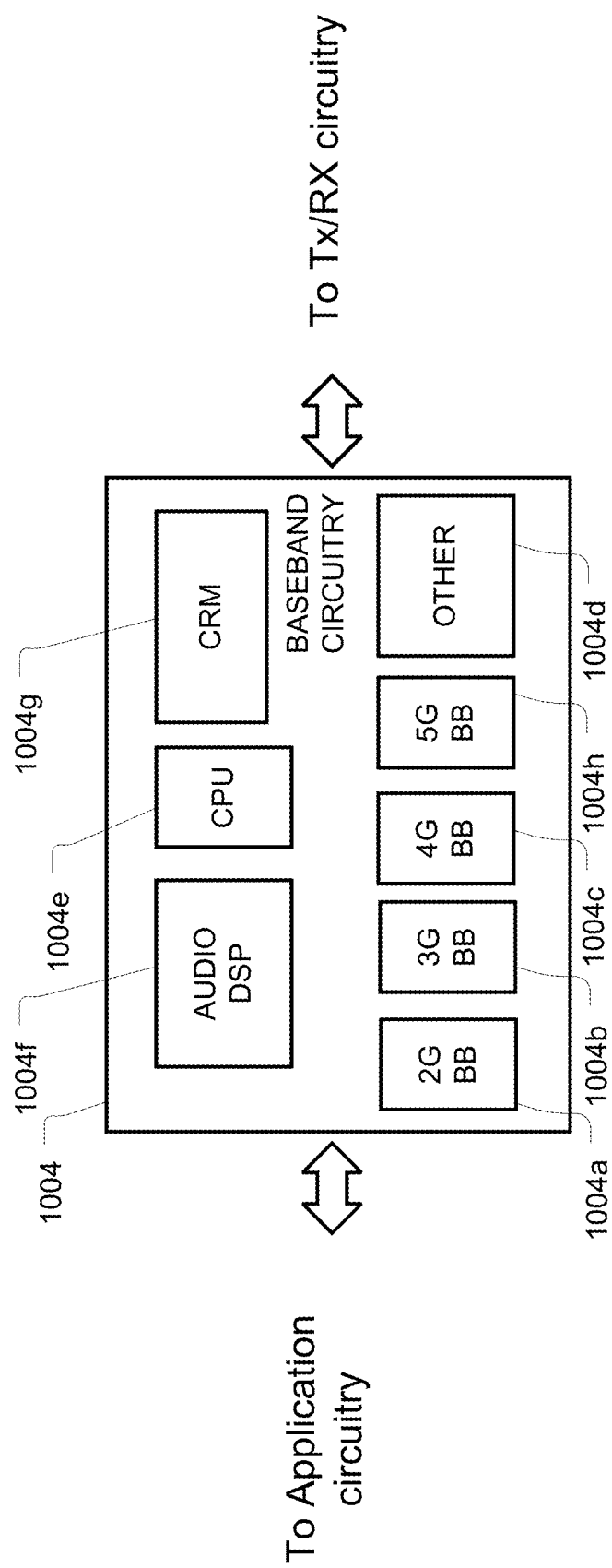
FIG. 10 illustrates baseband circuitry in accordance with some embodiments.

FIG. 10 illustrates baseband circuitry 1004 that may be implemented in the AN 110 or UE 105 in accordance with various embodiments. The baseband circuitry 1004 may be similar to, and substantially interchangeable with digital baseband circuitry 125 or 130 shown in FIG. 1. The baseband circuitry 1004 may interface with application circuitry (for example, protocol processing circuitry 115 or 120) and Tx/Rx circuitry (for example, transmit circuitry 135 or 140 or receive circuitry 145 or 150).

The baseband circuitry 1004 may perform any of the LBT or CWS adjustment procedures described herein for operation in NR-U with TB-based transmissions or CBG-based transmissions.

The baseband circuitry 1004 may include circuitry such as, but not limited to, one or more single-core or multi-core processors. The baseband circuitry 1004 may include one or more baseband processors or control logic to process baseband signals received from a receive signal path of receive circuitry and to generate baseband signals for transmit circuitry. Baseband processing circuitry 1004 may interface with the application circuitry for generation and processing of the baseband signals and for controlling operations of the Tx/Rx circuitry. For example, in some embodiments, the baseband circuitry 1004 may include a third generation (3G) baseband processor 1004A, a 4G baseband processor 1004B, a 5G baseband processor 1004C, or other baseband processor(s) 1004D for other existing generations, generations in development or to be developed in the future (e.g., second generation (2G), sixth generation (6G), etc.). The baseband circuitry 1004 (e.g., one or more of baseband processors 1004A-D) may handle various radio control functions that enable communication with one or more radio networks via the Tx/Rx circuitry. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 1004 and the application circuitry may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an E-UTRAN or other WMAN, a WLAN, a WPAN. Embodiments in which the baseband circuitry 1004 is configured to support radio communications of more than one wireless protocol may be referred to as multi-mode baseband circuitry.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the Tx/Rx circuitry may include analog-to-digital converter (ADC) and digital-to-analog converter (DAC) circuitry and the baseband circuitry 1004 may include a digital baseband interface to communicate with the Tx/Rx circuitry.

Processors of the baseband circuitry 1004 (and application circuitry) may be used to execute elements of one or more instances of a protocol stack. For example, processors of the baseband circuitry 1004, alone or in combination, may be used execute Layer 3, Layer 2, or Layer 1 functionality, while processors of the application circuitry may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 11:
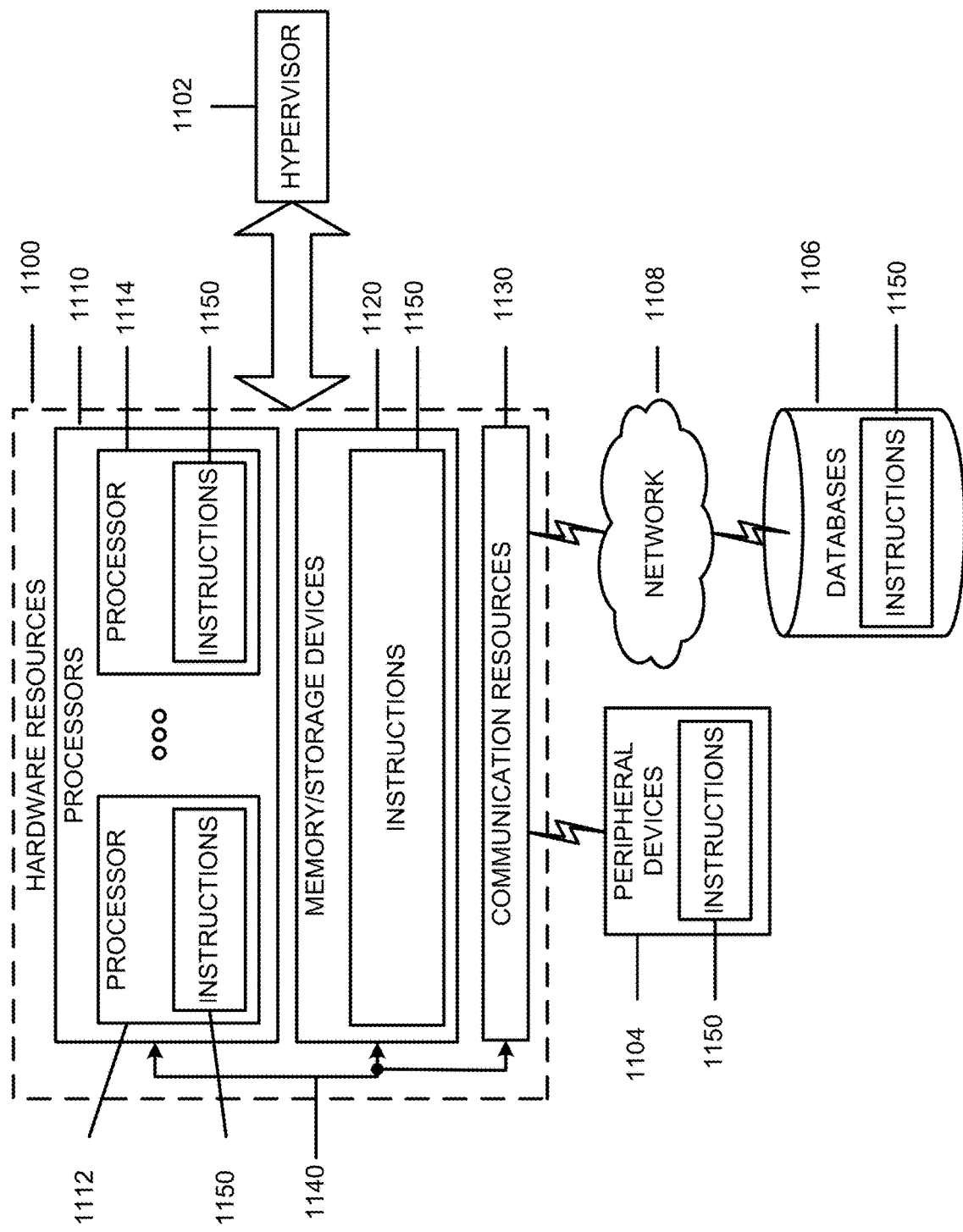
FIG. 11 illustrates components of an electronic device in accordance with some embodiments.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/sub-slices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein (for example, any of the SSB/RMSI-CORESET encoding/decoding methodologies described above). The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Some non-limiting examples are provided below.

Example 1 includes a method comprising: performing a listen-before-talk procedure for a New Radio—Unlicensed (NR-U) operation in a wideband with transport block (TB)-based transmissions or code-block group (CBG)-based transmissions configured; and transmitting a burst within a first phase and a second phase, wherein the burst is rate-matched in the second phase over a portion of the wideband in which the LBT procedure was successful.

Example 2 includes the method of example 1 or some other example, wherein the burst includes a reference burst and the method further comprises: receiving hybrid-automatic repeat request (HARQ) feedback corresponding to the reference burst; and adjusting a contention window size based on the HARQ feedback.

Example 3 includes the method of example 2 or some other example, wherein the reference burst includes a physical downlink shared channel (PDSCH) transmission that starts at a beginning of the burst; the reference burst includes a punctured portion and a non-punctured portion in the first phase; and the method further comprises: adjusting the contention window size based on the HARQ feedback that corresponds to the non-punctured portion.

Example 4 includes the method of example 2 or some other example, wherein the reference burst includes a physical downlink shared channel (PDSCH) transmission that includes a punctured portion and a non-punctured portion in the first phase; and the method, further comprises: applying first weights to HARQ feedback corresponding to the punctured portion to provide first weighted feedback; applying second weights to HARQ feedback corresponding to the non-punctured portion to provide second weighted feedback; and adjusting the contention window size based on the first and second weighted feedback.

Example 5 includes the method of example 2 or some other example, wherein the reference burst includes a physical downlink shared channel (PDSCH) transmission; and the method further comprises: weighting the HARQ feedback corresponding to the PDSCH transmission based on whether the PDSCH transmission is an initial transmission or a retransmission to provide a weighted feedback; and adjusting the contention window size based on the weighted feedback.

Example 6 includes the method of example 2 or some other example, wherein the reference burst includes a physical downlink shared channel (PDSCH) transmission that includes a punctured portion; and the method further comprises: weighting the HARQ feedback corresponding to the punctured portion of the PDSCH transmission based on a root cause of puncturing of the punctured portion to provide a weighted feedback; and adjusting the contention window size based on the weighted feedback.

Example 7 includes the method of example 2 or some other example, wherein the reference burst is to start X symbols, slots, subframes, or milliseconds after the LBT procedure is performed, where X is a predetermined value or is configured by radio resource signaling.

Example 8 includes the method of example 2 or some other example, wherein the reference burst is to start after downlink control information 2_0 is transmitted.

Example 9 includes the method of example 2 or some other example, wherein the method further comprises: adjusting the contention window size per transmission bandwidth or per channel.

Example 10 includes the method of example 2 or some other example, wherein the HARQ feedback includes feedback for a plurality of codeblock groups (CBGs) of a transport block (TB) within the reference burst and the method further comprises: doubling the contention window size if a percentage of NACKs of the plurality of CBGs within the reference burst is greater than a predetermined threshold.

Example 11 includes the method of example 2 or some other example, wherein a length of the reference burst is defined so that at least some HARQ feedback for physical downlink shared channel is expected to be available.

Example 12 includes the method of example 1 or some other example, wherein the method further comprises: mapping TBs or CBGs to resources of the first portion in frequency first, then in time.

Example 13 includes the method of example 2 or some other example, wherein the device is to operate in a stand-alone mode and the instructions, when executed, further cause the device to: setting a contention window size to a same value of a prior transmission containing data or if this is not available to a minimum value for a physical random access channel (PRACH) transmission or a physical uplink control channel (PUCCH) transmission.

Example 14 includes a method comprising: storing information related to a contention window size (CWS); setting a backoff counter based on the CWS; performing a listen-before-talk (LBT) procedure based on the backoff counter to determine that one or more bandwidth units of a transmission bandwidth is available; and transmitting a reference burst including a plurality of physical channels or repeated transmissions in the one or more bandwidth units.

Example 15 includes a method comprising: receiving a message with a new data indicator (NDI); resetting the CWS to a minimum value if the NDI is toggled; and increasing the CWS to a next higher value if the NDI is not toggled.

Example 16 includes the method of example 15 or some other example, further comprising: updating the CWS based on a determination that a physical uplink control channel (PUCCH) trigger and a PUCCH transmission are on a same carrier.

Example 17 includes the method of example 14, wherein the reference burst includes a PUCCH transmission and the method further comprises: determining whether a reset indicator is received within a DL assignment as an indicator of whether the PUCCH transmission is corrected received by the gNB; and updating the CWS based determination of whether the reset indicator is received.

Example 18 includes a method comprising: storing information related to a contention window size (CWS); processing a transmission; determining whether the transmission corresponds to an initial transmission or a retransmission; and adjusting the CWS based on determination of whether the transmission corresponds to the initial transmission or the retransmission.

Example 19 includes the method of example 18 or some other example, wherein the transmission is from an access node and is an uplink grant or a configured grant—downlink feedback indication (CG-DFI) and the method further comprises: determining, whether the transmission is scrambled with a cell—radio network temporary identifier (C-RNTI) or a configured scheduling—radio network temporary identifier (CS-RNTI); and determining, based on whether the transmission is scrambled with C-RNTI or CS-RNTI, whether the transmission corresponds to an initial transmission or a retransmission.

Example 20 includes the method of example 19 or some other example, wherein the transmission is an uplink grant, scrambled with C-RNTI, that schedules the initial transmission with a hybrid automatic repeat request (HARQ) process identifier (ID) that is associated with a HARQ process ID of an uplink shared channel (UL-SCH) that follows within a reference burst, and the processing circuitry is to reset the CWS, for every priority class, to its minimum value based on the uplink grant.

Example 21 includes the method of example 19 or some other example herein, wherein the transmission is an uplink grant and the method comprises: determining the uplink grant includes a new data indicator (NDI) that is toggled to indicate the uplink grant corresponds to an initial transmission; and resetting the CWS, for every priority class, to its minimum value based on the NDI being toggled.

Example 22 includes the method of example 19 or some other example herein, wherein the transmission is a CG-DFI that is an earliest CG-DFI, corresponding to an uplink transmission that is received after at least a minimum duration from the uplink transmission, that includes an acknowledgment, and the method further comprises: resetting the CWS, for every priority class, to its minimum value based on the receipt of the CG-DFI with the acknowledgment.

Example 23 includes the method of example 19 or some other example herein, wherein the transmission is an uplink grant and the method further comprises: determining the uplink grant includes a new data indicator (NDI) that is not toggled, which indicates the uplink grant corresponds to retransmission; and increasing the CWS, for every priority class, based on the NDI not being toggled.

Example 24 includes the method of example 19 or some other example herein, wherein the transmission is a CG-DFI that is an earliest CG-DFI, corresponding to an uplink transmission that is received after at least a minimum duration from the uplink transmission, that includes an acknowledgment, and the method further comprises resetting the CWS, for every priority class, to its minimum value based on the receipt of the CG-DFI with the acknowledgment.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, and/or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a method of communicating in a wireless network as shown and described herein.

Example 31 may include a system for providing wireless communication as shown and described herein.

Example 32 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media (NTCRM) having instructions that, when executed, cause a device to:
    perform a listen-before-talk procedure (LBT) for a New Radio-Unlicensed (NR-U) operation in a wideband with transport block (TB)-based transmissions or code-block group (CBG)-based transmissions configured;
    transmit a burst within a first phase and a second phase, wherein the burst is rate-matched in the second phase over a portion of the wideband in which the LBT procedure was successful, and wherein the burst includes a reference burst in the first phase with a punctured portion and a non-punctured portion;
    receive hybrid-automatic repeat request (HARQ) feedback corresponding to the reference burst; and
    adjust a contention window size for the second phase based on the HARQ feedback.

2. The one or more NTCRM of claim 1, wherein the reference burst includes a physical downlink shared channel (PDSCH) transmission that starts at a beginning of the burst; and the instructions, when executed, further cause the device to:
    adjust the contention window size based on the HARQ feedback that corresponds to the non-punctured portion.

3. The one or more NTCRM of claim 1, wherein the instructions, when executed, further cause the device to:
    apply first weights to HARQ feedback corresponding to the punctured portion to provide first weighted feedback;
    apply second weights to HARQ feedback corresponding to the non-punctured portion to provide second weighted feedback; and
    adjust the contention window size based on the first and second weighted feedback.

4. The one or more NTCRM of claim 1, wherein the reference burst includes a physical downlink shared channel (PDSCH) transmission; and the instructions, when executed, further cause the device to:
    weight the HARQ feedback corresponding to the PDSCH transmission based on whether the PDSCH transmission is an initial transmission or a retransmission to provide a weighted feedback; and
    adjust the contention window size based on the weighted feedback.

5. The one or more NTCRM of claim 1, wherein the reference burst includes a physical downlink shared channel (PDSCH) transmission; and the instructions, when executed, further cause the device to:
    weight the HARQ feedback corresponding to the punctured portion of the PDSCH transmission based on a root cause of puncturing of the punctured portion to provide a weighted feedback; and adjust the contention window size based on the weighted feedback.

6. The one or more NTCRM of claim 1, wherein the reference burst is to start X symbols, slots, subframes, or milliseconds after the LBT procedure is performed, where X is a predetermined value or is configured by radio resource signaling.

7. The one or more NTCRM of claim 1, wherein the reference burst is to start after downlink control information 2_0 is transmitted.

8. The one or more NTCRM of claim 1, wherein the instructions, when executed, further cause the device to:
adjust the contention window size per transmission bandwidth or per channel.

9. The one or more NTCRM of claim 1, wherein the HARQ feedback includes feedback for a plurality of code-block groups (CBGs) of a transport block (TB) within the reference burst and the instructions, when executed, further cause the device to:

double the contention window size if a percentage of NACKs of the plurality of CBGs within the reference burst is greater than a predetermined threshold.

10. The one or more NTCRM of claim 1, wherein a length of the reference burst is defined so that at least some HARQ feedback for physical downlink shared channel is expected to be available.

11. The one or more NTCRM of claim 1, wherein the instructions, when executed, further cause the device to:
map TBs or CBGs to resources of the first portion in frequency first, then in time.

12. The one or more NTCRM of claim 1, wherein the device is to operate in a standalone mode and the instructions, when executed, further cause the device to:
set a contention window size to a same value of a prior transmission containing data or if this is not available to a minimum value for a physical random access channel (PRACH) transmission or a physical uplink control channel (PUCCH) transmission.

* * * * *

UNITED STATES PATENT AND TRADEMARK OFFICE
CERTIFICATE OF CORRECTION

PATENT NO. : 11,394,500 B2
APPLICATION NO. : 16/828766
DATED : July 19, 2022
INVENTOR(S) : Salvatore Talarico et al.

Page 1 of 1

It is certified that error appears in the above-identified patent and that said Letters Patent is hereby corrected as shown below:

In the Claims

Column 24,
Line 20, Claim 1 move "LBT" after "listen-before-talk" and before "procedure".

Signed and Sealed this
Eighth Day of November, 2022

Katherine Kelly Vidal
*Director of the United States Patent and Trademark Office*